March 27, 1945.   O. JABELMANN   2,372,380
RAILWAY TRUCK STRUCTURE
Filed Oct. 5, 1942   2 Sheets-Sheet 2
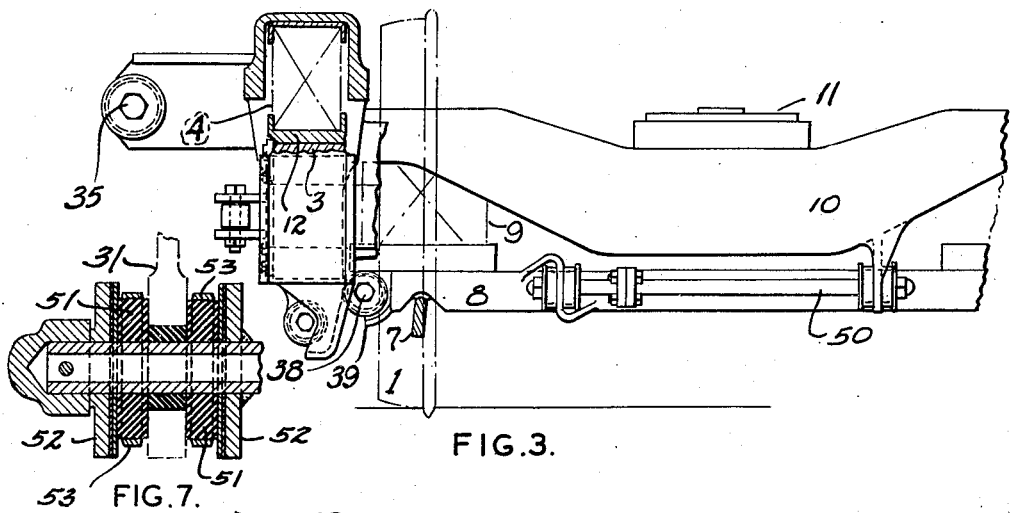
FIG.3.
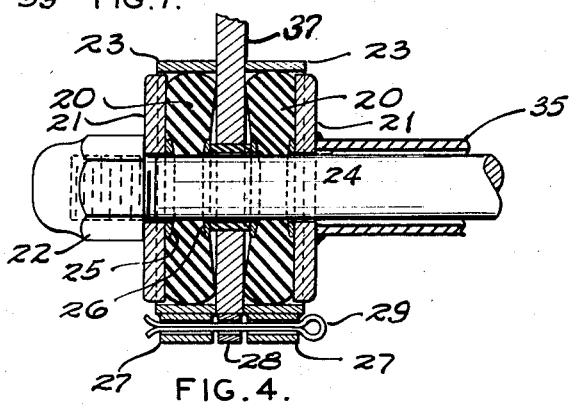
FIG.7.   FIG.4.
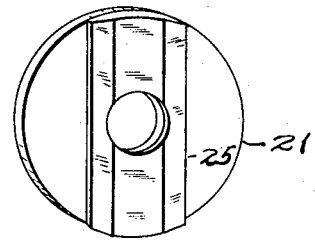
FIG.5.
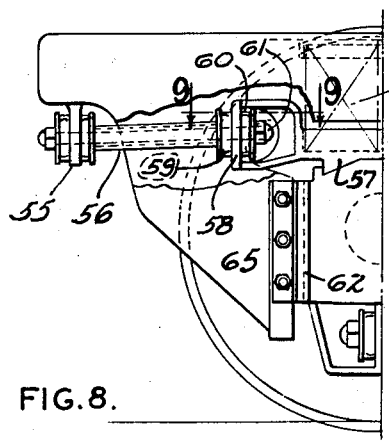
FIG.8.
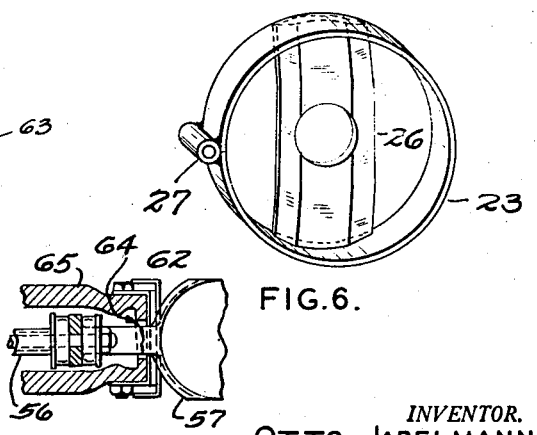
FIG.6.
FIG.9.
INVENTOR.
OTTO JABELMANN
BY Rodney Bedell
ATTORNEY Patented Mar. 27, 1945

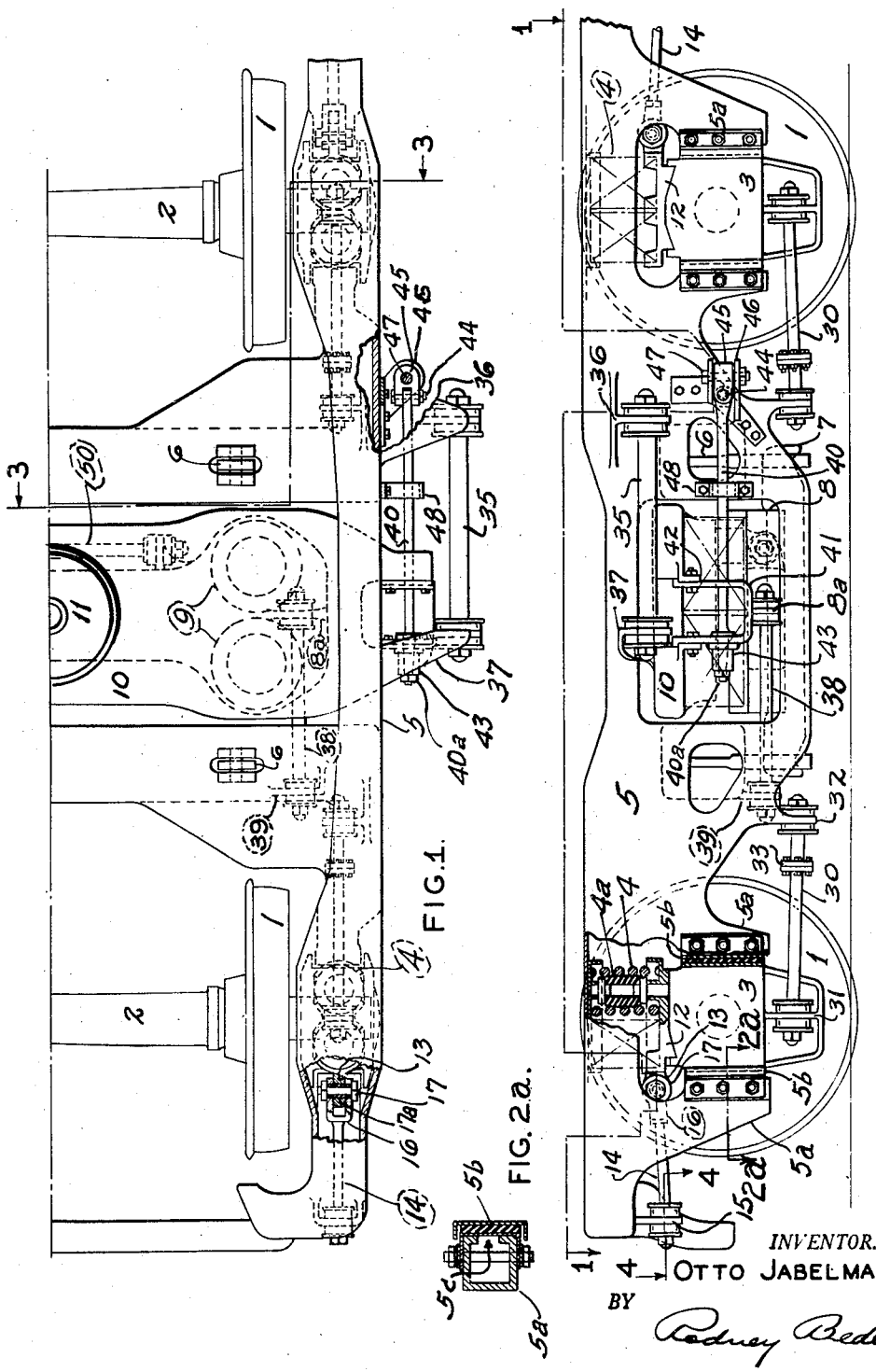

2,372,380

UNITED STATES PATENT OFFICE 2,372,380

RAILWAY TRUCK STRUCTURE

Otto Jabelmann, Omaha, Nebr.; Teresa R. Jabelmann administratrix of said Otto Jabelmann, deceased Application October 5, 1942, Serial No. 460,754

13 Claims. (Cl. 105—224)

The invention relates to railway rolling stock and more particularly to trucks for vehicles used in high speed service and in which the truck frame is yieldingly supported on the journal boxes by coil springs.

Such trucks usually provide for movement of the body supporting bolster transversely and vertically relative to the truck frame, and it is necessary to anchor the bolster to the truck frame so that it may move laterally and vertically as described but at the same time be held by cushioned resistance against substantial movement longitudinally of the frame.

Such trucks may also be provided with anchors between the journal boxes and truck frame so that the boxes may move laterally and vertically relative to the frame but at the same time be held by cushioned resistance against movement longitudinally of the truck. If the actions of the cushioning elements and the spring elements are not properly controlled, successive oscillations of these elements at certain speeds may give rise to a "galloping" or repeated tilting of the truck frame longitudinally of the vehicle resulting in bad riding of the trucks.

The main object of the present invention is to improve the riding qualities of the trucks of this general type by connecting the truck parts having movement vertically and transversely of the truck and relative to each other and to control particularly the vertical movements so that such movements do not create a "galloping" or tilting action of the truck frame in a longitudinal vertical plane. This general objective is attained in part by using yielding devices between the truck frame and the journal boxes and between the truck frame and the bolster, one type of such device consisting of anchors as shown generally in an application filed by the present inventor and James C. Travilla, Jr., on June 26, 1941, Serial No. 399,838, and another type consisting of a cantilever spring arrangement between the bolster and the frame as shown in the accompanying drawings.

Another object of the present invention is to improve the construction and operation of anchor devices of the type referred to. Such devices are constructed to transmit forces applied longitudinally of the device between the relatively moving truck parts and to yieldingly resist forces applied to the relatively moving truck parts transversely of the device.

A further object of the invention is to construct the journal box, frame, and anchoring means between the box and frame so that the boxes can be readily removed without removing the springs above the boxes and with the least possible disturbance of the anchoring means. This is accomplished by providing a separate spring seat on top of the journal box to which the top anchor device is connected, which seat is arranged to rest on the upper portion of the pedestal leg structure when the boxes are lowered to retain the springs, spring seat, and top anchor in position in the truck.

These and other detailed objects of the invention as will be apparent from the following description are attained by the structure illustrated in the accompanying drawings in which—

Figure 1 is a top view of the major portion of one longitudinal half of a four-wheel truck equipped with the invention, parts of the structure being sectioned horizontally, as indicated by the section and view line 1—1 in Figure 2.

Figure 2 is a side elevation of the structure shown in Figure 1.

Figure 2a is a detail horizontal section taken on the line 2a—2a of Figure 2.

Figure 3 is a transverse vertical section taken on the line 3—3 of Figure 1.

Figure 4 is an enlarged detail longitudinal horizontal section through one end of one of the anchor devices.

Figures 5 and 6 are isometric views of details of the structure shown in Figure 4.

Figure 7 is a view corresponding to Figure 4 but illustrating another form of the anchoring device.

Figure 8 is a detail section corresponding to the left hand end of Figure 2 but illustrating another form of the invention.

Figure 9 is a detail horizontal section taken on the line 9—9 of Figure 8.

The truck has the usual wheels 1 and axles 2 having outside journals mounting journal boxes 3. A plurality of coil springs 4 are mounted over each journal box and support the truck frame 5 which has depending pedestal legs 5a at the sides of the journal boxes. Preferably the construction and action of springs 4 is as described and claimed in a copending application filed of even date herewith, Serial No. 460,755. This structure includes an inner unit comprising a cylinder or block 4a of rubber-like material which, when distorted, initiates or increases frictional contact between the spring coil and the inner unit and snubs the action of the spring, thus preventing sychronization of the spring vibrations.

Swing hangers 6 are pivotally suspended from the frame and carry cross bars 7 and a spring plank 8 on which the bolster springs 9 and bolster 10 are mounted, the bolster having the usual center plate 11 for swivel supporting connection to the vehicle body.

While the truck supporting springs may be mounted directly upon boxes 3, a preferred construction includes a separate spring seat member 12 for each box, the member being provided with an ear 13 to which there is connected one end of an anchor device 14, the other end of the latter being connected to a bracket 15 depending from the truck frame. The right hand end of the anchor device terminates in a jaw 16 receiving ear 13. A bolt 17 passes through elements 13 and 16 and provides for their ready assembly and disassembly. Bolt 17 may be inserted and removed laterally of the truck through the space between the top of the journal box and the top of the pedestal jaw. Preferably bolt 17 is surrounded by a bushing 17a of rubber-like material.

The left hand end of anchor device 14 embodies construction similar to that shown in the above-mentioned application Serial No. 399,838 and also in V. L. Green Reissue Patent No. 21,987, issued December 30, 1941, but includes additional features referred to below.

With this arrangement the journal boxes can readily be removed without removing the springs 4 and the spring seats 12 and without disconnecting the top anchors 14. When the boxes are lowered, spring seats 12 rest on the upper ends of the pedestal liners 5b which are in general use and are detailed in the above-mentioned application Serial No. 399,838 and in J. C. Travilla, Jr. Patent No. 2,229,429, issued January 21, 1941. These pedestal liners project a substantial distance beyond the box opposing faces of the pedestal legs and will be engaged by seats 12, thus maintaining these seats, springs 4 and anchors 14 in position. To apply or remove seats 12 and springs 4, it is necessary to first remove the pedestal liners on both pedestal legs. A vertical slot 5c in the transverse wall of the outer pedestal leg (Figure 2a) accommodates the passage of ear 13. The remainder of the spring seat is of less width than the distance between the opposing faces of the pedestal legs.

An anchor device 30 extends between brackets 31 and 32 on the journal box and the truck frame respectively. This device is made in two parts detachably connected to each other by a coupling 33 and functions similarly to a corresponding device illustrated in the above-mentioned Travilla and Jabelmann application, Serial No. 399,838, but may include additional features discussed below.

Anchor devices 35 are connected at their ends to brackets 36 and 37 respectively on the truck frame and bolster and limit the relative movements of these truck parts.

An anchoring device 38 disposed longitudinally of the truck has one end connected to a bracket 8a on the spring plank and has its other end connected to a bracket 39 on the truck frame and yields to accommodate the relative vertical and lateral movements of these parts while offering cushioned resistance to the transmission between these parts of forces exerted longitudinally of the truck.

An anchor device 50 is connected at its ends to spring plank 8 and bolster 10 and functions similarly to the anchor devices previously described to yieldingly resist the relative movements of the spring plank and bolster, but this anchoring device does not materially affect the galloping tendency of the truck frame.

Each of the anchoring devices 14, 30, 35, 38 and 50 includes one or more features not previously used in devices of this type and these features are detailed in Figures 4, 5, 6 and 7.

At least one end of each of these anchor devices, such as device 35 connecting the bolster and truck frame, is detailed in Figure 4 and shows rubber pads 20 applied to opposite sides of the bolster bracket 37 and held against the bracket by washers 21, the inner washer being secured to the body of the anchor device and the outer washer being movably held in adjusted position by a nut 22 to better control the action of the rubber pads. An annular ring or band 23 surrounds each rubber pad 20 and the adjacent washer 21 and confines the rubber pad so as to limit its radial bulging. Hence the distortion of the rubber pads will be limited when forces are applied longitudinally of the anchor device or when the anchor rubber is compressed due to lateral inclination of the anchor device. When the connected truck parts move transversely or vertically of the truck relative to each other, device 35 will be inclined from its normal position and the rod portion 24 of the device extending through pads 20 will tend to move radially of the pads, this movement being accommodated by flow of the cushion material from one side of the rod to the other, but each ring will prevent bulging of the periphery of its pad which would too freely permit inclination or lateral movement of the rod.

Different degrees of resistance to tilting action of the anchor device may be provided by transverse bars in the form of ridges 25 on washers 21 (Figure 5) and ridges 26 on rings 23 (Figure 6). Each of these bars has a width approximately one-third of the diameter of the washer or ring to which it is applied and extends diametrically of the latter and is welded to the washer or ring. Each ring 23 and the adjacent flange to which the device is connected may be provided with aligned apertured lugs 27 and 28 respectively to receive a cotter 29 to hold the anchor device with its bars 25 and 26 in a predetermined angular position.

Obviously each of these bars engages and restricts the distortion of the adjacent portion of the corresponding rubber pad, leaving the portions of the pad at the side of the bar to distort more readily. Hence the resistance of the anchor device to tilting in one angular plane may be varied to its resistance to tilting in a different angular plane. For example, the anchoring device 35, as shown in Figures 1, 2 and 3, offers substantially greater resistance to tilting in the vertical plane than to tilting in the horizontal plane, thus accommodating the relative movement of the frame and bolster transversely of the frame more freely than their relative vertical movement.

Any of the anchor devices may embody the modified arrangement of its cushions detailed in Figure 7 which shows rubber cushions 51 applied to opposite sides of the truck part bracket 31 and held against the same by washers 52. Annular rings 53 limit the radial bulging of cushions 51 and this structure functions similarly to that previously described except that inclination of the anchoring device is resisted to a substantially uniform degree irrespective of the radial plane in which the inclination takes place. Washers 52 are of substantially larger diameter than rings 53 and prevent movement of the rings endwise and off of the cushions. Preferably anchoring devices 14 and 30 connecting the journal box to the frame will not include the diametral rib feature because it is desirable that these anchoring devices offer cushioned resistance to hold the box in position longitudinally of the truck relative to the truck frame but offering little or no resistance to relative vertical or lateral movement of the box and frame. It is desirable that the boxes may move quickly in vertical and transverse directions to accommodate irregularities in the rail. Obviously when this feature is not included, there is no object in providing the lugs 27 and 28 and cotter 29 for insuring a predetermined angular arrangement of the anchoring device when it is assembled with the parts which it connects.

Cooperating with anchor devices 35 and 38 in yieldingly resisting relative movement of the frame and bolster transversely and vertically of the truck is a cantilever spring rod 40 having one end fixedly attached to the bolster by the bolting of a yoke 41 to the bolster lugs 42, there being a collar 43 welded to one leg of the yoke and having a tapered inner periphery receiving the tapered end of rod 40 which is tightly seated in the socket by nut 40a. The other end of rod 40 is pivotally connected by a horizontal bolt 44 to a clevis 45 pivoted to frame lugs 46 by a vertical bolt 47. A safety strap 48 is also secured to the truck frame and surrounds the intermediate portion of rod 40. This structure yieldingly resists relative movements of the truck frame and bolster vertically and transversely of the truck.

The center plate connection transmits the vertical load between the vehicle body and the bolster, thereby holding the bolster and vehicle body against relative tilting in a vertical plane extending longitudinally of the truck. The connection of member 40 to the truck frame at a point on the latter spaced longitudinally of the truck from the bolster resists the relative tilting of the bolster and truck frame in a longitudinal vertical plane. Hence this structure cooperates with anchor devices 14, 30 and 35 to dampen the action of the springs on the journal box and to prevent galloping of the truck frame.

Anchor device 30 cooperates with device 14 to resist substantial relative movement of the frame and box longitudinally of the truck, and these devices also resist substantial rotation of the journal box on the axle and thereby prevent frictional contact between the sides of the box and the opposing faces of the pedestal legs. At the same time the pads of rubber-like material cushion thrusts transmitted through the devices between the frame and box.

Figures 8 and 9 illustrate another arrangement of the anchorage between the truck frame and the journal box spring seat. The frame bracket 55 and the associated elements of the anchor device 56 correspond to the similar parts of the structure previously described, but the right hand end of the anchor device is the same as the left hand end, and the spring seat 57 includes a pocket extending outwardly towards the end of the truck and having a transverse upstanding web 58 extending between and gripped by the rubber pads 59 of the anchor rod. The right hand pad 59 and the associated ring 60 and clamping nut 61 may be inserted through the side of the pocket in the spring seat for application to and removal from the end of the anchor rod.

The widened portions of the spring seat 57 overlie the tops of the pedestal liners 62, thus holding the truck springs 63 in assembly when the boxes and axles and wheels are dropped from the frame. By removing the pedestal liners the narrow projection on the seat member, to which the anchor rod is attached, may be dropped through a slot 64 in the pedestal legs 65 to near the bottom of the pedestal legs where the inner end of the seat may be tilted downwardly and the pocket-forming end of the seat may be canted and withdrawn through slot 64.

The details of construction may be varied other than as shown without departing from the spirit of the invention, and the exclusive use of the modifications coming within the scope of the claims is contemplated.

What is claimed is:

1. Structure for anchoring one railway truck part to another relatively movable truck part comprising an elongated arm having devices at its ends for connecting the arm to respective truck parts, at least one of said devices comprising a flat sided disc-like cushion of rubber-like material with its axis extending lengthwise of the arm, means applicable to one side of the cushion for pressing its opposite side against a truck part, and a ring surrounding the periphery of the cushion to limit its radial distortion but spaced from the cushion periphery in part to accommodate some radial distortion of the cushion when the arm is inclined from its normal position, there being a bar of restricted width and of rigid material extending diametrically of the cushion and alongside one face thereof to stiffen the adjacent portion of the cushion and thereby render the resistance to the relative movement of the truck parts in one plane passing through the axis of the elongated arm greater than the resistance to relative movement of the truck parts in a plane passing through said axis transversely of the first-mentioned plane.

2. Structure for anchoring one railway truck part to another relatively movable truck part comprising an elongated arm having devices at its ends for connecting the arm to respective truck parts, at least one of said devices comprising a disc-like cushion of rubber-like material with substantially flat sides, means for clamping the cushion against a truck part, and a relatively narrow bar of rigid material extending diametrically of the cushion and along one face thereof to stiffen the adjacent portion of the cushion and thereby render the resistance of the anchoring structure to inclination in its axial plane extending lengthwise of the bar greater than its resistance to inclination in a transverse axial plane.

3. Structure for anchoring one railway truck part to another relatively movable truck part comprising an elongated arm having devices at its ends for connecting the arm to respective truck parts, at least one of said devices comprising a disc-like cushion of rubber-like material with substantially flat sides, means for clamping the cushion against a truck part, a relatively narrow bar of rigid material extending diametrically of the cushion and along one face thereof to stiffen the adjacent portion of the cushion and thereby render the resistance of the anchoring structure to inclination in its axial plane extending lengthwise of the bar greater than its resistance to inclination in a transverse axial plane, and means for holding the bar in desired angular relation to the truck part to which the adjacent end of the structure is connected, 4. Structure for anchoring one railway truck part to another relatively movable truck part comprising an elongated arm having devices at its ends for connecting the arm to respective truck parts, at least one of said devices comprising a cushion of rubber-like material, means for clamping the cushion against a truck part, and a ring surrounding the periphery of the cushion to limit its radial distortion, there being substantially parallel bars of restricted width extending transversely of the cushion at opposite sides of the latter to stiffen a restricted diametral portion of the cushion and thereby render the resistance of the elongated arm to inclination in one plane greater than its resistance in a transverse plane.

5. Structure for anchoring one railway truck part to another relatively movable truck part comprising an elongated arm having devices at its ends for connecting the arm to respective truck parts, at least one of said devices comprising a cushion of rubber-like material, means for clamping the cushion against a truck part, a ring surrounding the periphery of the cushion to limit its radial distortion, relatively narrow bars of rigid material extending diametrically of the cushion and along opposite faces thereof to stiffen the portion of the cushion between said bars and thereby render the resistance of the anchoring structure to inclination in its axial plane extending lengthwise of the bars greater than its resistance to inclination in a transverse axial plane, said bars being secured respectively to said means and ring, and interengaging elements on said ring and the adjacent truck part and holding said bars against movement relative to the associated truck part about the axis of the device.

6. Structure for anchoring one railway truck part to another relatively movable truck part comprising an elongated arm having devices at its ends for connecting the arm to respective truck parts, at least one of said devices comprising opposing members spaced apart longitudinally of said arm, disc-like cushions of rubber-like material with substantially flat sides between said members and spaced from each other to receive and yieldingly clamp a truck part between them, and band means surrounding the periphery of said cushions to limit their radial distortion but spaced from the cushion peripheries in part to accommodate some radial distortion of the cushions.

7. Structure for anchoring one railway truck part to another relatively movable truck part comprising an elongated arm having devices at its ends for connecting the arm to respective truck parts, at least one of said devices comprising opposing members spaced apart longitudinally of said arm, disc-like cushions of rubber-like material with substantially flat sides between said members and spaced from each other to receive and yieldingly clamp a truck part between them, and an individual band surrounding each of said cushions to limit its distortion radially but spaced from the cushion periphery in part to accommodate some radial distortion of the cushion.

8. Structure for anchoring one railway truck part to another relatively movable truck part comprising an elongated arm having devices at its ends for connecting the arm to respective truck parts, at least one of said devices comprising opposing members spaced apart longitudinally of said arm, disc-like cushions of rubber-like material between said members and spaced from each other to receive and yieldingly clamp a truck part between them, an individual band surrounding each of said cushions to limit its distortion radially, each of said members and the associated band having substantially parallel bars of restricted width extending transversely of the corresponding cushion at opposite sides of the latter to stiffen a restricted diametral portion of the cushion and thereby render the resistance of the elongated arm to inclination in one plane greater than its resistance in a transverse plane.

9. Structure as described in claim 8 which includes a holding element secured to the associated truck part and both of said bands to hold all of the bars parallel and to prevent their movement relative to the associated truck part about the axis of the device.

10. In a railway truck having a wheeled axle and a journal box mounted thereon, a truck frame having an upwardly extending recess to receive the axle and journal box, a spring seat member detachably carried on the journal box, said seat member and box having interengaging elements preventing their relative movement longitudinally of the truck, an anchor device comprising an elongated arm extending longitudinally of the truck through a portion of said frame at the side of said recess and having connections at its ends to said seat member and to said frame, said connections accommodating vertical movement of the frame relative to said seat member and box and resisting relative movement of the frame longitudinally of the truck relative to said member and box.

11. Structure as described in claim 1 in which the cushion-clamping means includes disc-like members of greater diameter than the ring to retain the ring in a position about the cushion.

12. In a railway vehicle truck, a truck frame with pedestal legs, an axle box slidable vertically therebetween, a separately formed spring seat member mounted on said box, a spring thereon for supporting the frame, a device for anchoring the spring seat member to another truck part comprising an elongated arm with one end provided with a connection to said member and with its other end provided with a connection for the other truck part, at least one of said connections providing resistance to the relative movement of the member longitudinally of the arm relative to the other truck part while accommodating movement of the member vertically relative to the truck part, said member including means engaging the box to prevent relative movement of the member and box longitudinally of the arm, there being upwardly and downwardly facing elements on said pedestal legs and seat member respectively opposing each other and limiting the downward movement of the seat member, the box being movable downwardly from the seat member for dropping the associated axle and wheel from the truck without disassembly of the member and the other truck part to which it is connected.

13. In a railway vehicle truck, a truck frame with pedestal legs, an axle box slidable vertically therebetween, a separately formed spring seat member mounted on said box, a spring thereon for supporting the frame, a device for anchoring the spring seat member to another truck part comprising an elongated arm with one end pivotally connected to said member and comprising a cushion of rubber-like material and means for clamping the cushion against the other truck part, and with its other end provided with a connection for the other truck part, said member including means engaging the box to prevent relative movement of the member and box longitudinally of the arm, there being upwardly and downwardly facing elements on said pedestal legs and seat member respectively opposing each other and limiting the downward movement of the seat member, the box being movable downwardly from the seat member for dropping the associated axle and wheel from the truck without disassembly of the member and the other truck part to which it is connected.

OTTO JABELMANN.